(12) United States Patent
Martensson

(10) Patent No.: US 8,706,485 B2
(45) Date of Patent: Apr. 22, 2014

(54) METHOD AND DEVICE FOR MNEMONIC CONTACT IMAGE ASSOCIATION

(75) Inventor: Joakim Martensson, Lund (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 132 days.

(21) Appl. No.: 13/109,681

(22) Filed: May 17, 2011

(65) Prior Publication Data

US 2012/0008875 A1    Jan. 12, 2012

Related U.S. Application Data

(60) Provisional application No. 61/363,746, filed on Jul. 13, 2010.

(30) Foreign Application Priority Data

Jul. 9, 2010   (EP) .................................. 10169013

(51) Int. Cl.
| | | |
|---|---|---|
| *G10L 15/00* | (2013.01) | |
| *G10L 21/00* | (2013.01) | |
| *G10L 13/00* | (2006.01) | |
| *G06F 17/28* | (2006.01) | |
| *G10L 25/00* | (2013.01) | |
| *G06F 3/12* | (2006.01) | |
| *G06K 9/54* | (2006.01) | |
| *H04N 7/14* | (2006.01) | |
| *G06F 17/00* | (2006.01) | |
| *G06T 13/00* | (2011.01) | |
| *H04M 11/00* | (2006.01) | |

(52) U.S. Cl.
USPC ........... 704/235; 704/276; 704/246; 704/260; 704/273; 704/7; 382/305; 348/14.01; 700/94; 345/473; 379/100.02

(58) Field of Classification Search
USPC .............. 704/246, 276, 7, 260, 273; 382/305; 358/1.15; 348/14.01; 700/94; 345/473; 379/100.02
See application file for complete search history.

(56) References Cited

U.S. PATENT DOCUMENTS 6,275,789 B1 *   8/2001   Moser et al. ...................... 704/7
6,522,417 B1 *   2/2003   Kakigahara et al. ......... 358/1.15
(Continued)

FOREIGN PATENT DOCUMENTS

| EP | 1 326 445 | 7/2003 |
| EP | 1 555 635 | 7/2005 |

(Continued)

OTHER PUBLICATIONS

European Search Report for corresponding application No. EP 10169013.9, mailed Dec. 1, 2010.

*Primary Examiner* — Pierre-Louis Desir
*Assistant Examiner* — Neeraj Sharma
(74) *Attorney, Agent, or Firm* — Renner, Otto, Boisselle & Sklar, LLP

(57) ABSTRACT

The present invention pertains to method and a communication device (100) for associating a contact record pertaining to a remote speaker (220) with a mnemonic image (191) based on attributes of the speaker (220). The method comprises receiving voice data of the speaker (220); in a communication session with a source device (200). A source determination representing the speaker (220) is registered, and then the received voice data is analyzed so that voice data characteristics can be extracted.

Based on these voice data characteristics a mnemonic image (191) can be selected, and associated to a contact record in which the source determination is stored.

The mnemonic image (191) may be selected among images previously stored in the device, or derived through editing of such images.

15 Claims, 2 Drawing Sheets

(56) References Cited

U.S. PATENT DOCUMENTS

| | | | |
|---|---|---|---|
| 6,987,514 B1* | 1/2006 | Beresin et al. | 345/473 |
| 8,107,605 B2* | 1/2012 | Jaffres et al. | 379/100.02 |
| 2003/0117485 A1* | 6/2003 | Mochizuki et al. | 348/14.01 |
| 2005/0159958 A1* | 7/2005 | Yoshimura | 704/276 |
| 2008/0154609 A1* | 6/2008 | Wasserblat et al. | 704/273 |
| 2008/0243278 A1* | 10/2008 | Dalton et al. | 700/94 |
| 2009/0018839 A1* | 1/2009 | Cooper et al. | 704/260 |
| 2010/0082345 A1* | 4/2010 | Wang et al. | 704/260 |
| 2011/0288866 A1* | 11/2011 | Rasmussen | 704/246 |

FOREIGN PATENT DOCUMENTS

| | | |
|---|---|---|
| JP | 3-270390 | 2/1991 |
| JP | 2008-113331 | 5/2008 |

* cited by examiner

METHOD AND DEVICE FOR MNEMONIC CONTACT IMAGE ASSOCIATION

CROSS-REFERENCE TO RELATED APPLICATION

This application claims the benefit of European Patent Application No. EP 10169013.9, filed Jul. 9, 2010, and U.S Provisional Patent Application No. 61/363,746, filed Jul. 13, 2010, the entire disclosure of which is hereby incorporated by reference.

TECHNICAL FIELD

The present application relates to image selection for contact records and, in particular, a method and device for selecting and associating a mnemonic image with a contact record based on voice data characteristics.

BACKGROUND

Many application programs, especially those involving communications-related functions, provide an address book or contacts feature. This feature allows users to input contact information for individuals, including name, title, company, physical address, as well as logical addresses, i.e. source determinations such as phone numbers, e-mail addresses etc., and save the information as a contact record.

Some contact applications allow the user to store an image associated with the contact. This allows the user to store, for example, a photograph of an individual in the contact record that contains information pertaining to that individual. The image may be stored in a field within the contact record and/or stored as an attachment to the contact record. The image and the contact record may further be stored in separate locations, and the image is then coupled to the contact record by storing in the contact record a pointer such as a link or a memory address, that points to the image. This type of coupling between an image and a contact record is commonly referred to as association.

The association of an image with a contact record can be useful for many applications, especially those relating to communications. For example, in a voice call application, upon receiving an incoming call from a phone number a user contact record that comprises that phone number may be displayed as part of a "call ID" function, including the associated image of the user. This allows the recipient of the call to quickly visually identify the identity of the caller.

Communications activities and applications are particularly relevant to mobile devices. Accordingly, the association of image data and contact records may be of particular use in the context of mobile devices. However, mobile devices differ from desktop computers and the like in that they have limited storage and processing capacity and a heightened concern with conserving battery power and minimizing bandwidth usage in wireless communications. Detailed images present a challenge to mobile devices in that regard.

Some contact applications also include a "save unknown number" feature. Whenever a call from an unknown telephone number is terminated, the user is asked whether he or she wishes to save this number as part of a new contact. During this process, the user may add the callers name and other information to the new contact record, including a photo. However, if the caller is unknown, the user usually does not have access to a suitable photo of the caller.

Moreover, for a person who regularly receives calls from callers not previously on record, searching for appropriate images for every new contact record would assume an unwarrantable amount of time and effort. At the same time the more new contact records on file, the more important it is to be able to distinguish between them, and be able to recall certain basic data about the callers associated with the contact records.

Accordingly, it would be advantageous to provide for a method and apparatus for automatic image selection and association with a caller contact record based on characteristics of the caller in the context of a mobile device.

SUMMARY

It is an object of the present invention to provide improved methods and devices for associating mnemonic images to contact records. In particular, it is an object to enable creation and use of images that can serve as mnemonic images even though the visual appearance of a certain speaker is not known to a user who keeps a contact record pertaining to that speaker.

A first aspect of the present invention is a method in a communication device for associating a contact record pertaining to a remote speaker with a mnemonic image based on attributes of the speaker. The method comprises the steps of receiving, in a communication session with a source device, voice data of the speaker; registering a source determination representing the speaker in said communication session; analyzing the received voice data to extract voice data characteristics; selecting a mnemonic image based on the voice data characteristics; and associating the mnemonic image to a contact record in which the source determination is stored.

The registering step may further comprise reading the source determination; and determining whether the read source determination is previously stored in an existing contact record in said communication device.

If the read source determination is not stored in an existing contact record, the associating step may comprise the further preluding steps of creating a new contact record; and storing the source determination in the created record.

The analyzing voice data step may comprise extracting a set of voice characteristics from the voice data, and/or extracting a set of language characteristics from the voice data.

The method according to the first aspect of the invention may further comprise deducing a speaker descriptor based on the extracted characteristics, which may pertain to voice or language; and casting at least one speaker descriptor for a search key. The generic definition of the word descriptor is "a piece of information used to identify an item in an information storage and retrieval system." The term "speaker descriptor" is here defined as a descriptor that capture essential attributes of a speaker to whom the voice belongs. A speaker descriptor may pertain to a speakers assumed or confirmed visual appearance, spoken language, age, or other attributes. A generic definition of search key is "the data entered and used in a search routine to match other data in a database." The term "search key" is here defined as a set of one or may descriptors pertaining to a particular speaker that can be used as a basis for comparison, matching or search in a search for contact records, images or other data stored in the communication device.

The casting step may further comprise casting multiple speaker descriptors for the search key according to a predetermined ranking policy.

The selecting image step may further comprise comparing the search key against descriptive metadata of candidate images stored in said communication device; electing from said candidate images a first image that has the highest match rating according to a predefined rating system; and deriving a mnemonic image from the first image.

The deriving step may further comprise linking a first descriptor of the search key to a second descriptor of the search key by editing a first elected image comprising the first descriptor such that a second descriptor is being introduced into a mnemonic image.

A second aspect of the present invention is a mnemonic image rendering communication device. This communication device comprises a processing unit and is adapted and configured for associating a contact record pertaining to a remote speaker with a mnemonic image based on attributes of the speaker. The communication device is characterized in that the processing unit is configured to receive, in a communication session with a source device, voice data of the speaker;
- register a source determination representing the speaker in said communication session;
- analyze the received voice data to extract voice data characteristics;
- select a mnemonic image based on the voice data characteristics; and
- associate the mnemonic image to a contact record in which the source determination is stored.

The communication device may further comprise a memory unit adapted and configured to store contact records and images. The processing unit may further be adapted and configured to read the source determination and determine whether the read source determination is stored in an existing contact record in the memory unit; and then to associate the mnemonic image to an existing contact record in which the source determination is stored.

The processing unit may further be configured to extract a set of characteristics pertaining to language and/or voice from the voice data; deduce a speaker descriptor based on the extracted set of characteristics; and cast a search key comprising at least one speaker descriptor.

The processing unit may further be configured to cast speaker descriptors to be comprised in the search key according to a predetermined descriptor ranking policy.

The processing unit may further be configured to compare the search key against descriptive metadata of candidate images stored in said memory unit; to elect from said candidate images a first image that has the highest match rating according to a predefined rating system; and to derive a mnemonic image from the first image.

A third aspect of the present invention is a computer readable medium comprising program code with instructions arranged to be executed by a processor of a communication device, wherein the instructions cause the communication device to perform the method according to the first aspect.

A fourth aspect of the present invention is a computer program comprising program code with instructions arranged to be executed by a processor of a communication device, wherein the instructions cause the portable communication to perform the method according to according to the first aspect.

Embodiments of the present invention have the advantage of supporting rendering of mnemonic images during incoming calls, this to assist a user in recalling significant aspects of a speaker with whom he or she may have spoken to only very briefly. As opposed to passport-type photos associated with contact records in existing art, mnemonic images are not limited to imitating visual appearance of the speaker.

DETAILED DESCRIPTION

Figures 1A, 1B, 1C:
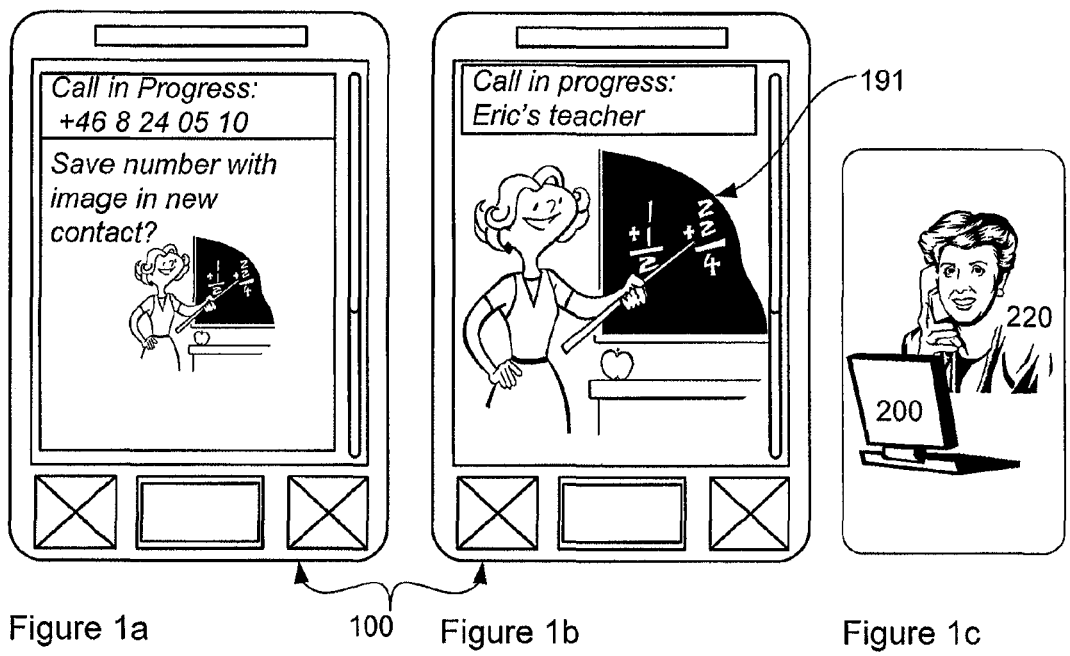
FIGS. 1a and 1b are front views of a communication device according to the present invention.
FIG. 1c illustrates a speaker and a source device.

A mnemonic communication device according to the present invention will now be described in relation to FIG. 1. The mnemonic communication device 100 can be a mobile phone, fixed phone, Internet Protocol (IP) enabled telephone, media player with communication capabilities, IP enabled TV, set-top box with uplink capabilities, personal computer, palmtop computer, personal digital assistant, etc.

FIG. 1 schematically shows front views of the communication device 100 according to an embodiment of the present invention. The communication device 100 includes input/output devices such a number of keys on a keypad provided below an image rendering device, such as for instance an LED display, a loudspeaker and a microphone. These are all common features for a portable communication device, and are well known by a person skilled in the art and are therefore not described in detail.

The internal component structure of the communication device 100 according to one embodiment will now be described with reference to FIG. 2. The communication device 100 of FIG. 2 has a processing unit 110 which serves as a controller of other components. For instance, the processing unit 110 is operatively coupled with a user interface 120 of the device 100. In the disclosed embodiment, the user interface 120 comprises the keys and the display, and it may comprise voice control functionality.

The processing unit 110 may for instance be implemented by a CPU a DSP, an FPGA or an ASIC.

The communication device 100 may comprise a communication interface 130 for communication over a PSTN and/or a PLMN. The communication interface 130 may be further be adapted for short-range wireless data communication such as Bluetooth™, IrDA, WLAN or NFC, and it may also comprise an interface for cable-based communication such as USB.

The communication device 100 further comprises a memory unit 140, which may be comprised in, coupled to or otherwise associated with the processing unit 110. The memory unit 140 may be realized by any available kind of memory device, such as a RAM memory, a ROM memory, an EEPROM memory, a flash memory, a hard disk, or any combination thereof, and may be made up of a single physical memory device or a plurality of physical memory devices. The memory unit 140 may be used for various purposes by the processing unit 110, including storing of images, voice prints etc. and data and program instructions required for functionality of the device 100, such as "number presentation" and "save unknown number".

Figure 2:
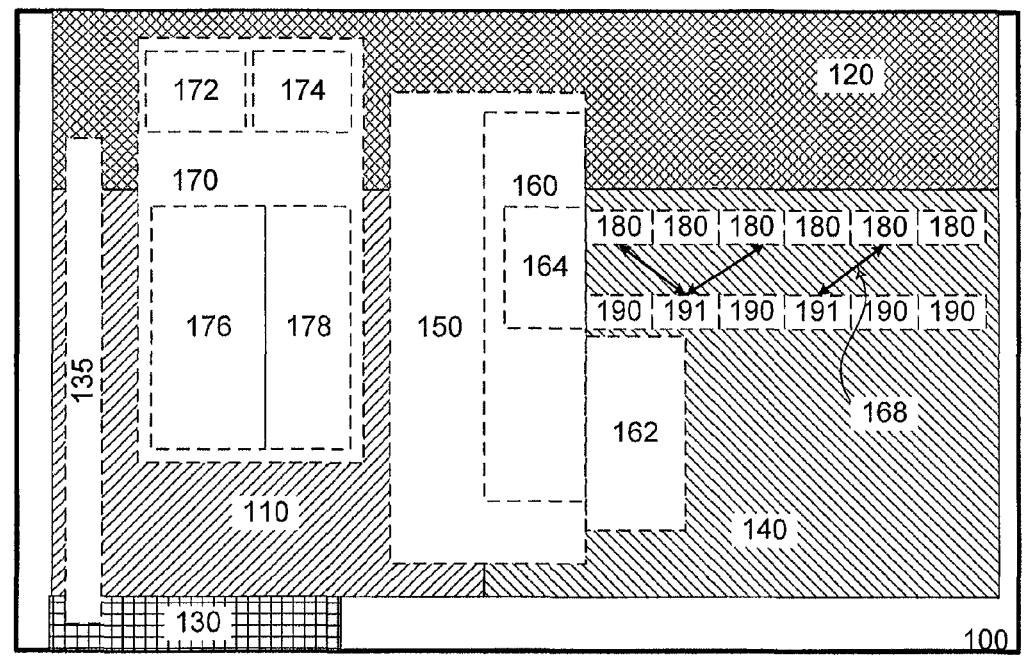
FIG. 2 is a schematic overview of structural and functional components of the communication device.

Dashed boxes in FIG. 2 refer to functional elements of the device 100. The communication device 100 may be adapted and configured to provide a contacts function 150 for storing and administration of contact records 180. Each contact record 180 may include fields relating to an individual's name, address, title, organization, phone number(s), facsimile number(s), e-mail addresses, voice prints, and other details. A number presentation function 135 in the communication device 100 is configured to read the source determination. Source determinations are used to set up sessions between a client in the communication device 100 and a client in the source device 200. Any phone number, e-mail address, International Mobile Subscriber Identity (IMSI), Mobile Subscriber Integrated Services Digital Network Number (MSISDN), or Session Initiation Protocol (SIP) address or other subscriber label associated with the client from whom the data was received will henceforth be referred to as source determination. In embodiments of the present application, a contact record may be associated with a mnemonic image 191. The image 191 in an individual's contact record 180 may be a photograph or an image that assists the user of the device 100 in recalling significant aspects of a speaker 220 using a source device 200 as shown in FIG. 1c.

The contacts function 150 further provides a contact editor function 160 for adding, deleting, or modifying individual contact records 180 from the memory unit 140. The contact editor 160 provides a user interface through which a user may create a new contact record, delete an existing contact record, and/or modify the contents of a contact record. Changes made to a contact record 180 through the contact editor 160 are saved to a flash memory 162 comprised in the memory unit 140. The contact editor 160 may comprise an image selector function 164 for creating associations 168 between a contact record 180 and a mnemonic image 191.

Mnemonic images rely on cognitive links between easy-to-remember constructs which can be related back to the speaker 220 that is to be remembered. This is based on the principle that the human mind much more easily remembers spatial, personal, surprising, sexual, humorous or otherwise meaningful information than arbitrary number sequences. Imagery strengthens the cognitive links needed in a mnemonic. The imagery can be private, vivid, absurd or childish as long as it helps association. A slow speaker may be associated with a tortoise, a Swede with a swede, a happy voice with a smiling mouth etc.

Links can be created between a thing to be remembered and a way of remembering it. This can be done through concatenating or merging imagery, for instance a smiley against a Swedish flag or a smiling swede. Gender and age group may meritoriously be linked using a graphic editing policy and scheme, for instance rendering an image monochrome, altering color tint or shade, altering color saturation, contrast, intensity or cropping to alter image border shape according to a predetermined scheme. You may link "female" to red, "male" to blue, "young age" to low saturation, "middle age" to medium saturation etc. A light blue smiling turnip rendered by the display 100 may then make the user associate to a young, upbeat Swedish gentleman that he has previously spoken to on the device 100.

Composing a mnemonic image may thus comprise any of the steps of concatenating images, merging images, editing images, retouching images or cropping images in order to create cognitive links.

Images suitable for and available to contact association 168 are henceforth referred to as candidate images 190 and are stored in the memory unit 140 of device 100. The candidate images 190 may be pre-loaded onto the communication device 100 at manufacture or provisioning. The candidate images 190 may include images received by the communication device 100 as attachments to an electronic message. The candidate images 190 may include images obtained by the user via a web browser from one or more web pages on the Internet. The candidate images 190 may include images captured by a camera comprised in the device 100.

The candidate images 190 may be stored in a variety of file formats. Some of the more common image file formats include JPEG, GIF, TIFF and BMP.

The communication device 100 moreover has an audio unit 170 which includes a loudspeaker 172 and a microphone 174. An audio CODEC 176 is arranged to transform the electric audio signals from the microphone 174 into a format suitable for the processing unit 110. The Audio CODEC 176 is also used to transform audio data from the processing unit 110 into electrical audio signals to the loudspeaker 172.

The audio unit 170 further comprises a voice unit 178, which may be a voice co-processor, speech synthesizer or other circuitry, that assists the audio CODEC 176 and the processing unit 110 in their tasks of handling, analyzing, processing and transforming voice-related data and signals.

It is further possible to implement automatic recognition of speakers from their voice [Proc. IEEE, Vol. 64, pp. 4-475].

Speaker recognition is here defined as the computing task of validating a speaker's identity using characteristics extracted from the speaker's voices. Speaker recognition uses the acoustic features of speech that have been found to differ between individuals. These acoustic patterns are behavioral biometrics that reflect both anatomy, e.g., size and shape of the throat and mouth, and learned behavioral patterns, e.g., voice pitch, or speaking style.

Speech recognition is defined as the computing task of recognizing what is being said.

Figure 3:
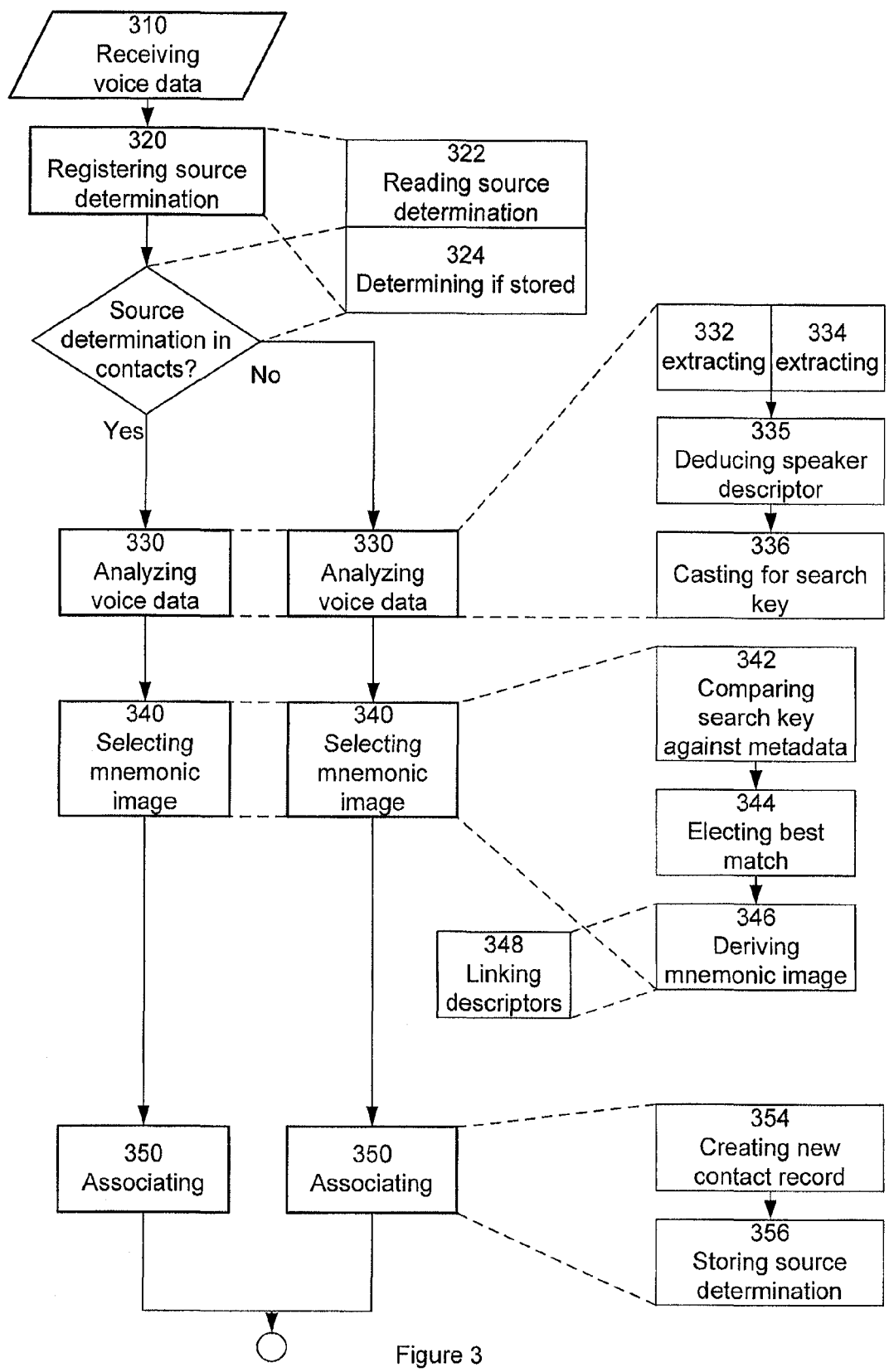
FIG. 3 is a flow chart illustrating a method according to embodiments of the invention.

FIG. 3 is a flow chart illustrating a method 300 for associating a contact record 180 in a communication device 100 with a mnemonic image 191 according to one embodiment of the invention. The method comprises a first step 310 of receiving the speaker's 220 voice data from a source device 200 via a communication interface comprised in the interface unit 130. The voice featured by the voice data belongs to a speaker 220 and may comprise speech, singing or other vocal audio signals. The voice data may feature single words or sentences. The voice data may be comprised in inter alia a voice mail, a multimedia message or a voice call. It may arrive as streamed data or as downloaded files. The voice data is received in a communication session between the communication device 100 and a source device 200, which may be a PDA (Personal Digital Assistant), a mobile phone, a landline telephone, a computer etc. Source determinations are used to set up sessions between a client in the communication device 100 and a client in the source device 200. The same source device 200 may be able to communicate via a multitude of source determinations, and several source devices may be able to communicate via the same source determination.

Voice data may be received and recorded during a phone call, after which it may be stored in the memory unit 140 of the device 100. Files and streamed data of various formats may be converted by the processing unit 110 to appropriate data format and stored in the memory unit 140.

Then a registering step 320 registers the source determination. First the communication device 100 is reading the source determination in a reading step 322. If the voice data is received during a phone call initiated by the device 100, the source determination may be read from an internal listing of the latest dialed number in the device 100. The source determination may also be read by the number presentation function 135 configured in the device 100. If the voice data is received in an e-mail, the source determination may be an e-mail address that is read from the "from" originator field in the header.

In the registering step 320 the contact storing function 150 in the communication device 100 may also determine whether the source determination is stored in an existing contact record 180 or whether a new contact record in which to store the source determination should be created. This is done in a determining step 324.

In an analyzing step 330 the voice unit analyzes the voice data to deduce descriptors of the speaker 220 to whom the voice belongs. The generic definition of the word descriptor is "a piece of information used to identify an item in an information storage and retrieval system." The term "speaker descriptor" is here defined as a descriptor that capture essential attributes of a speaker (220) to whom the voice belongs. The speaker descriptor may pertain to a speakers assumed or confirmed visual appearance, spoken language, age, or other attributes. This step comprises a further extracting step 332 in which a set of voice characteristics is extracted from the voice data by the voice unit 178, characteristics such as for example pitch, frequency, power spectrum values or spectrum coefficients. Linear predictive coding and other well-known tools for speech processing may be used. Based on speech processing of the voice data, certain assumptions can be made about features of the speaker 220 to whom the voice belongs.

In a deducing step 335 the processing unit deduces a speaker descriptor based on the extracted set of voice characteristics.

In the analyzing step 330 language characteristics may also be determined, thereby enabling speech recognition, and further word content analysis. In this step focal vocabulary may be determined.

If so, the voice unit 178 extracts a set of language characteristics from the voice data in an extracting step 334. The language characteristics set may comprise information relating to spoken language, focal vocabulary or speech pace featured in the received voice data. It may further contain information on dialect. The extracted set of language characteristics may also be used as a basis for deducing speaker descriptors in a deducing step 335.

A speaker descriptor may be cast for a search key in a casting step 336. The generic definition of "search key" is "the data entered and used in a search routine to match other data in a database." The term "search key" is here defined as a set of descriptors pertaining to a particular speaker 220 that can be used as a basis for comparison, matching or search in a search for contact records, images or other data stored in the communication device 100. The search key may be implemented as a multidimensional data structure having different fields for different descriptor categories. These categories could for instance be gender, age or mood. A search key may comprise several descriptors of the same category, for certain categories. For example, in the mood category, it may be of value to record that a certain speaker sounded both sad and tired at the same time, while it would be pointless or confusing to record a speaker as both male and female. If gender is undecided it is better either to leave that category empty, or have an "undecided" gender descriptor.

TABLE 1

| | Descriptor | | | | |
|---|---|---|---|---|---|
| A<br>Gender | B<br>Language | C<br>Age | D<br>Focal voc. | E<br>Mood | F<br>Pace |
| 1 Male (M) | English (E) | Child (C) | Family (F) | Happy (H) | Fast (F) |
| 2 Female (F) | Swedish (S) | Young adult (Y) | Work (W) | Sad (S) | Medium (M) |
| 3 Undef. (U) | | Middle aged (M) | Telem. (T) | Tired (T) | Slow (S) |
| 4 | | Senior (S) | School (S) | Vexed | |

In the casting step 336, the search key may be formatted appropriately for comparison with image metadata. In the casting step the descriptors may be cast according to a pre-determined descriptor ranking policy.

The search key is simple enough to enable comparison against image metadata without demanding excessive processing and buffer memory. A plain set of unformatted descriptors may constitute the search key.

It may comprise a limited number of descriptors only. This may mean that descriptors belonging to a higher ranked category will be cast for the search key at the expense of descriptors of a lesser category rank.

In a selecting step 340, the image selector 168 selects an image based on voice data characteristics.

The images comprise metadata which in turn comprises image descriptors in a format that enables search key matching.

This is performed through comparing the search key against descriptive metadata of one candidate image 190 in a matching step 342. A descriptor that in matching 342 is found both in the search key and in the metadata of the candidate image 190 is a descriptor match. It is understood that an image comprising at least one descriptor match in its metadata may be defined as an image that at least partly matches the search key.

Image descriptors are defined as indexing terms that capture the essence of an image. Image descriptors can be obtained by analyzing an image itself, either manually with subject indexing, or with automatic indexing according to some available image analysis software.

The image descriptors are stored in the metadata of the image in such a way that a large number of candidate images' metadata may be may be compared to the search key sequentially in an efficient and effective way.

The speaker and image descriptors are index terms that make up a controlled vocabulary for use with the contact records, and they enable organization and editing of the contact records. Each contact record 180 associated with a speaker 220 may also be associated with one or many descriptors. This may be accomplished by associating a search key to the contact record.

In certain embodiments of the method according to the invention the matching 342 is made only against particular candidate images, that is, images of a particular format that has been optimized for this purpose. In other embodiments of the invention any image stored in the communication device 100 may be a candidate image.

A match rating function may be configured in the device 100, so that during matching 342 the candidate images 190 may be rated for relevance. During matching 342 the processing unit 110 keeps track of the candidate image 190 having the highest match rate so far.

In an electing step 344 an image with metadata that completely matches the search key may be elected as a best match. This step may then occur as soon as a perfectly matching image has been found, thereby saving time and processing power.

Alternatively, an image that has the highest match rating according to a predefined rating system may be elected as a best match in the electing step 344, upon finished comparison of all image candidates. It is also possible to check the rating against a predefined rating threshold. If the highest rating is below the rating threshold, then there is no best match. This enables the election of a void image, i.e. virtually no image, manual image election of an image, or election of a default image, which is sometimes to be preferred rather than a potentially misleading image.

Certain descriptor categories may be considered more valuable than others. With reference to table 1 above, Category A taken alone may be considered a more effective mnemonic than category B, category C and category D taken together. Therefore mnemonic weight may be assigned and distributed to the categories B, C and D so that their collective weight does not exceed the weight of the category A. If a search key comprising descriptors a1, b1, c1, d1 in categories A, B, C, D is matched against a first image having descriptors a1, e1, f1, g1 in categories A, E, F, G, and a second image with descriptors h1, b1, c1, d1 in categories H, B, C, D, then the first image carries more mnemonic weight than the second image in relation to the search key being matched. Therefore the first image will eventually be selected.

Alternatively all categories of the search key may be assigned equal mnemonic weight. In that case the second image would have been selected instead, since it has three features in common with the search key being matched, whereas the first image has only one feature in common. It is possible to elect two images, which is advantageous especially if their respective image descriptors complete each other vis-à-vis the search key.

Graphic properties such as for instance chromaticity schemes, color hue or saturation may carry mnemonic significance, and graphic properties of an image may therefore be edited so that descriptors are introduced into the image.

For the sake of clarity, the term editing embraces any graphical manipulation of images including retouching, cropping, merging, collaging and concatenating.

In a deriving step 346, the elected image may be designated as the mnemonic image 191 without any editing whatsoever.

The deriving step may also comprise a linking step 348, linking a first descriptor of the search key to a second descriptor of the search key by retouching or cropping a first elected image comprising a first descriptor match, according to a predetermined scheme such that the second descriptor is being introduced inherently.

According to certain embodiments, a multitude of images that collectively constitute a high match rate is being elected.

The linking step 348 may then comprise concatenating, collaging or merging the first image to a second image comprising the second descriptor, which may be previously unmatched.

The image derived through editing of at least a first image is then designated as the mnemonic image 191.

In an association 350 step the mobile communication device 100 associates the mnemonic image 191 to a contact record 180 in which the source determination is stored. A mnemonic image is a visual memory aid intended for rendering by the device 100 in association with a communication session with any source determination stored in the contact record.

If in the registration step 320 it has been decided that the source determination is not presently stored in a contact record, a new contact record is created in a step 354, in which the source determination is subsequently stored in a step 356. The selected image 191 is then associated to the new contact record.

The mnemonic image 191 may similarly be rendered in association with e-mail, instant messaging, or other communications, based on source determination, to give a visual cue to the user regarding the identity of the other party to the communication.

The different descriptors may vary in significance relative to each other. The search key may comprise deducted speaker descriptors that are selected based on a predetermined descriptor ranking. For example, during a call from a certain telephone number, voice data is received. It is a female voice; she sounds young and speaks at high pace. The words she uses pertain to a large extent to a focal vocabulary that is predefined in the device 100, and labeled "telemarketer". The user of communication device 100 has indicated that "telemarketer" overrides other descriptors and therefore receives the highest match ranking. Therefore, the communication device 100 will not try to analyze or subsequently match any features beyond "telemarketing". Instead it retrieves an image that may be a designated "telemarketing" image and offers to save this image in association with the telephone number. Either the telephone number is then saved in a collective contact record to which the "telemarketing" image has already been assigned, or the communication device 100 offers to create a new contact record for each new telemarketer, and then associates the "telemarketing" image to this new contact record. In the latter case, the image association may be done through saving a link in the contact record 180 to where the mnemonic image 191 is saved, in order to save memory space.

Embodiments of the present have the advantage that they support rendering of mnemonic images 191 to assist the user of the device 100 in recalling significant aspects of a speaker 220. As opposed to photos associated with contact records in existing art, this mnemonic image 191 is not limited to imitating visual appearance of a speaker 220 to whom the voice belongs, as is the case in existing art, where passport type photos are used.

Embodiments of the present application are further not limited to any particular operating system, mobile device architecture, server architecture, or computer programming language.

The invention claimed is:

1. A method in a communication device having a contacts function for storing and administration of contact records, the method being operative for associating a contact record pertaining to a remote speaker with a mnemonic image based on attributes of the speaker, the method comprising the steps of:
   receiving, in a communication session with a source device, voice data of the speaker;
   registering a source determination representing the speaker in said communication session;
   analyzing the received voice data to extract voice data characteristics of the speaker;
   selecting a mnemonic image configured to create cognitive links with the speaker based on the voice data characteristics of the speaker; and
   associating the mnemonic image with the contact record pertaining to the remote speaker and in which the source determination is stored such that, upon receiving a subsequent request for an incoming communication session from the speaker as identified by the source determination, the mnemonic image is displayed by the device for a user of the device to visually identify the speaker as associated with the subsequent request for the incoming communication session based on the voice data characteristics of the speaker; and
   wherein the contact record includes contact details associated with the speaker, wherein a pointer that points to the mnemonic image selected based on the voice data characteristics is stored in the contact record which includes at least one of a phone number and an e-mail address of the speaker to associate the mnemonic image with the contact record.

2. The method according to claim 1, the registering step comprising the further steps of:
   reading the source determination; and
   determining whether the read source determination is previously stored in an existing contact record in said communication device.

3. The method according to claim 2, wherein if the read source determination is not stored in an existing contact record, the associating step comprises the further preluding steps of:
    creating a new contact record; and
    storing the source determination in the created record.

4. The method according to claim 1, the analyzing voice data step comprising the further step of:
    extracting a set of voice characteristics from the voice data.

5. The method according to claim 1, the analyzing voice data step comprising the further step of:
    extracting a set of language characteristics from the voice data.

6. The method according to claim 4, comprising the further steps of:
    deducing at least one speaker descriptor based on the extracted characteristics, wherein the at least one speaker descriptor is a description that describes the speaker but does not directly indicates identity of the speaker; and
    casting at least one speaker descriptor for a search key.

7. The method according to claim 6, the casting step comprising the further step of: casting multiple speaker descriptors for the search key according to a predetermined ranking policy.

8. The method according to claim 6 the selecting image step comprising the further steps
    comparing the search key against descriptive metadata of candidate images stored in said communication device;
    electing from said candidate images a first image that has the highest match rating according to a predefined rating system; and
    deriving a mnemonic image from the first image.

9. The method according to claim 8, where the deriving step further comprises:
    linking a first descriptor of the search key to a second descriptor of the search key by editing a first elected image comprising the first descriptor such that a second descriptor is being introduced into a mnemonic image.

10. A mnemonic image rendering communication device having a contacts function for storing and administration of contact records and adapted and configured for associating a contact record pertaining to a remote speaker with a mnemonic image based on attributes of the speaker, said device comprising a processing unit adapted and configured to
    receive, in a communication session with a source device, voice data of the speaker;
    register a source determination representing the speaker in said communication session;
    analyze the received voice data to extract voice data characteristics of the speaker;
    select a mnemonic image configured to create cognitive links with the speaker based on the voice data characteristics of the speaker; and
    associate the mnemonic image with the contact record pertaining to the remote speaker and in which the source determination is stored such that, upon receiving a subsequent request for an incoming communication session from the speaker as identified by the source determination, the mnemonic image is displayed by the device for a user of the device to visually identify the speaker as associated with the subsequent request for the incoming communication session based on the voice data characteristics of the speaker; and
wherein the contact record includes contact details associated with the speaker, wherein a pointer that points to the mnemonic image selected based on the voice data characteristics is stored in the contact record which includes at least one of a phone number and an e-mail address of the speaker to associate the mnemonic image with the contact record.

11. The mnemonic image rendering communication device according to claim 10, further comprising a memory unit, the processing unit further configured to
    read the source determination;
    determine whether the read source determination is stored in an existing contact record in the memory unit; and
    associate the mnemonic image with an existing contact record in which the source determination is stored.

12. The mnemonic image rendering communication device according to claim 10, the processing unit further configured to
    extract a set of characteristics pertaining to language and/or voice from the voice data;
    deduce at least one speaker descriptor based on the extracted set of characteristics deducing at least one speaker descriptor based on the extracted characteristics, wherein the at least one speaker descriptor corresponds to a description that describes the speaker but does not directly indicates identity of the speaker; and
    cast a search key comprising at least one speaker descriptor.

13. The mnemonic image rendering communication device according to claim 12, the processing unit further configured to cast speaker descriptors to be comprised in the search key according to a predetermined descriptor ranking policy.

14. The mnemonic image rendering communication device according to claim 12, the processing unit further configured to compare the search key against descriptive metadata of candidate images stored in said memory unit;
    elect from said candidate images a first image that has the highest match rating according to a predefined rating system; and
    derive a mnemonic image from the first image.

15. A non-transitory computer readable medium comprising program code with instructions arranged to be executed by a processor of a communication device, wherein the instructions cause the communication device to perform the method according to claim 1.

\* \* \* \* \*